(12) United States Patent
Kupsky et al.

(10) Patent No.: US 11,535,778 B2
(45) Date of Patent: Dec. 27, 2022

(54) LATENT REACTIVE ADHESIVE FILM

(71) Applicant: tesa SE, Norderstedt (DE)

(72) Inventors: Marco Kupsky, Quickborn (DE); Thilo Dollase, Hamburg (DE); Matthias Koop, Norderstedt (DE); Philipp Preuss, Norderstedt (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 17/051,074

(22) PCT Filed: Apr. 26, 2019

(86) PCT No.: PCT/EP2019/060780
§ 371 (c)(1),
(2) Date: Oct. 27, 2020

(87) PCT Pub. No.: WO2019/207125
PCT Pub. Date: Oct. 31, 2019

(65) Prior Publication Data
US 2021/0214593 A1    Jul. 15, 2021
US 2022/0049139 A9    Feb. 17, 2022

(30) Foreign Application Priority Data
Apr. 27, 2018 (DE) .................. 10 2018 206 632.9

(51) Int. Cl.
C09J 175/04    (2006.01)
C08K 5/14     (2006.01)
C08K 5/00     (2006.01)

(52) U.S. Cl.
CPC .......... *C09J 175/04* (2013.01); *C08K 5/14* (2013.01); *C08K 5/0025* (2013.01); *C08L 2666/66* (2013.01); *C09J 2301/408* (2020.08)

(58) Field of Classification Search
None
See application file for complete search history.

(56) References Cited

U.S. PATENT DOCUMENTS 3,994,764 A * 11/1976 Wolinski ............ C09J 175/04
525/445
4,725,637 A    2/1988 Fernyhough
(Continued)

FOREIGN PATENT DOCUMENTS

CN    1229723 A    9/1999
CN   101675715 A    3/2010
(Continued)

OTHER PUBLICATIONS

International Search Report, International Patent Application No. PCT/EP2019/060780, European Patent Office, dated Jul. 24, 2019, 4 pages.
(Continued)

*Primary Examiner* — Satya B Sastri
(74) *Attorney, Agent, or Firm* — Price Heneveld LLP

(57) ABSTRACT

The invention relates to an adhesive film which comprises a layer of an adhesive that comprises one or more polymers and at least one peroxide, characterized in that the adhesive comprises at last 50% by weight of thermoplastic polymers that do not have C=C multiple bonds, in that at least one peroxide has the general structural formula R—O—O—R', wherein R and R' each represent organyl groups or together represent a cyclic organyl group, and in that the peroxide in solution has a 1-minute half-life temperature of less than 200° C. In a preferred embodiment, the thermoplastic polymer is a polyurethane and the peroxide is a dicumyl peroxide.

20 Claims, 2 Drawing Sheets

(56) References Cited

U.S. PATENT DOCUMENTS

| | | | | |
|---|---|---|---|---|
| 6,013,750 | A * | 1/2000 | Friese | C08F 290/067 526/218.1 |
| 7,854,990 | B2 * | 12/2010 | Komori | B32B 17/10788 428/354 |
| 10,400,140 | B2 * | 9/2019 | Schumann | C09J 133/06 |
| 10,711,163 | B2 * | 7/2020 | Schumann | C09J 7/00 |
| 2003/0109638 | A1 * | 6/2003 | Briggs | C09J 4/06 525/192 |
| 2003/0178138 | A1 * | 9/2003 | Tsukagoshi | H05K 3/323 156/326 |
| 2016/0108287 | A1 * | 4/2016 | Schumann | C08L 75/04 156/327 |

FOREIGN PATENT DOCUMENTS

| | | |
|---|---|---|
| DE | 102009005518 A1 | 7/2010 |
| DE | 102010013145 A1 | 2/2011 |
| DE | 102013222739 A1 | 12/2014 |
| DE | 112012001974 B4 | 3/2016 |
| EP | 287928 A2 | 10/1988 |
| EP | 0650987 A1 | 5/1995 |
| EP | 894841 B1 | 5/2003 |
| EP | 1308492 B1 | 9/2005 |
| EP | 1734092 A1 | 12/2006 |
| GB | 1536271 | 12/1978 |
| GB | 1536271 A * | 12/1978 ............ C09J 177/00 |
| JP | 2005054140 A | 3/2005 |
| JP | 4846567 B2 | 12/2011 |
| WO | 9325599 A1 | 12/1993 |
| WO | WO-2014202402 A1 * | 12/2014 .............. C08L 75/04 |

OTHER PUBLICATIONS

German Office Action, German Patent Application No. 10 2018 206 632.9, German Patent Office, dated Jan. 16, 2019, 2 pages.

Donatas Satas, Handbook of Pressure Sensitive Adhesive Technology, 1999, 609-631, 3rd. Ed., Satas & Associates, Warwick, Rhode Island, U.S.A. (12 pages).

China National Intellectual Property Administration, Second Office Action for China Patent Application No. 201980039354.8, dated May 11, 2022, 3 pages (translation).

"Rubber Engineering", Indian Rubber Institute, Mar. 31, 2002, p. 297.

Chinese National Intellectual Property Administration, Third Office Action, Chinese Patent Application No. 201980039354.8, dated Aug. 16, 2022.

* cited by examiner

LATENT REACTIVE ADHESIVE FILM

CROSS-REFERENCE TO RELATED APPLICATIONS

This application is a national stage application under 35 U.S.C. § 371 that claims the benefit of priority under 35 U.S.C. § 365 of International Patent Application Serial No. PCT/EP2019/060780, filed on Apr. 26, 2019, designating the United States of America, which in turn claims the benefit of priority under 35 U.S.C. § 119 of German Patent Application No. 10 2018 206 632.9, filed Apr. 27, 2018, the contents of which are relied upon and incorporated herein by reference in their entirety.

FIELD OF THE DISCLOSURE

The invention relates to an adhesive comprising one or more polymers and at least one peroxide, and to a latently reactive adhesive film comprising at least one layer of such an adhesive.

BACKGROUND

Adhesive films are a means that has long been known for bonding of two substrates to one another, in order to get around the disadvantages of liquid adhesives. Among the advantages of adhesive films are good storability and transportability, good configurability, and easy applicability on use. According to the adhesive used for the adhesive film, it is possible to achieve good repositioning properties with nevertheless ultimately very high bonding forces.

Adhesive tapes are used in various forms nowadays, for example as aids in processes and for bonding of different objects. Many self-adhesive tapes containing pressure-sensitive adhesives have permanent tack. They can typically perform their bonding function immediately after bonding without further curing. Such self-adhesive tapes can therefore sometimes achieve very high bond strengths. Nevertheless, in particular applications, there is the need for bonding solutions that permit even higher bond strengths than conventional self-adhesive tapes.

Many such bonding systems that lead to high-strength bonds are applied in a hot compression step. The adhesives used—that are frequently not self-adhesive at room temperature—then melt, wet the bonding substrate and build up strength through solidification during cooling. Such bonding systems may additionally have chemical reactivity. By virtue of such reactions, it is possible to increase the cohesion of the adhesive and hence further optimize the bond strength. Furthermore, such reactions can have a positive effect on chemical stability and weathering stability.

Some reactive adhesives comprise a polymer composition which is reactive with a curing agent and a corresponding curing agent. The polymer here has functional groups that can be made to react with corresponding groups of the curing agent under appropriate activation. The term "curable adhesive composition" in the prior art therefore covers those formulations that contain functional groups which, through the action of a corresponding curing component in combination with elevated temperature as an additional stimulus, can participate in a reaction that leads to an increase in molar mass and/or crosslinking of at least one formulation constituent and/or covalently binds different formulation constituents to one another.

Peroxides are known as curing agents for unsaturated polymer systems. For example, EP 0 650 987 A discloses a tacky fluorinated polymer which, in a grafting operation, can be bound to molecules that have been prepared from different organic materials or inorganic materials and have at least one functional linking group capable of grafting onto the fluorinated polymer. The fluorinated polymer may be a thermoplastic. Peroxides are mentioned as free-radical initiators for the reaction with the fluorinated polymer.

U.S. Pat. No. 4,725,637 describes nitrile rubber-containing formulations that can be crosslinked with peroxides. EP 287 928 describes EVA-containing formulations that can be crosslinked with peroxide, especially for cable sheathing. Very small amounts of peroxide are disclosed as being suitable. There is no mention of adhesive films.

US 2003/0178138 A discloses electrically conductive, reactive adhesive films for bonding of two electrodes. Adhesive compositions used are mixtures of adhesives and pressure-sensitively adhesive conductive polymers, especially polyphthalide. The adhesive may, inter alia, be an irreversibly hot-curing adhesive (thermoset) or a thermoplastic adhesive (hotmelt).

The adhesive tape comprising the hot-curing adhesive may consist of a film-forming matrix polymer and a reactive system composed of an unsaturated polymerizable compound and a polymerization initiator. The polymerization initiator for such unsaturated compounds may be a dialkyl peroxide.

There is no disclosure or suggestion of the curing or crosslinking of thermoplastic polymers, especially in the absence of free-radically polymerizable and unsaturated systems, by peroxides.

DE 10 2013 222 739 discloses adhesive films containing a thermoplastic polyurethane, acrylate monomers and a free-radical initiator, e.g. a hydroperoxide. Cumene hydroperoxide is mentioned specifically.

It is an object of the invention to provide particularly storage-stable but thermally reactive adhesive films based on thermoplastic polymers. The adhesive films are advantageously also storage-stable at elevated temperatures. Further advantageously, the bonds established with the adhesive films have good moisture/heat stability. They are to feature rapid curability.

A further, preferably additional advantage desired is that the adhesive films do not exude any volatile constituents as a result of the curing reaction under the bonding conditions employed, especially in order to avoid blistering.

SUMMARY OF THE DISCLOSURE

It has now been able to be found in accordance with the invention that adhesives—synonymous with "adhesive compositions"—based on a polymer component comprising at least 50% by weight of thermoplastic polymers, are suitable for establishment of the desired adhesive films in the presence of peroxides even when thermoplastic polymers lacking C—C multiple bonds are used. These polymers thus do not have any free-radically polymerizable groups.

According to another aspect of the disclosure, a method of joining two substrates using the adhesive film of the disclosure is provided.

DETAILED DESCRIPTION OF THE PREFERRED EMBODIMENTS

Figure 1:
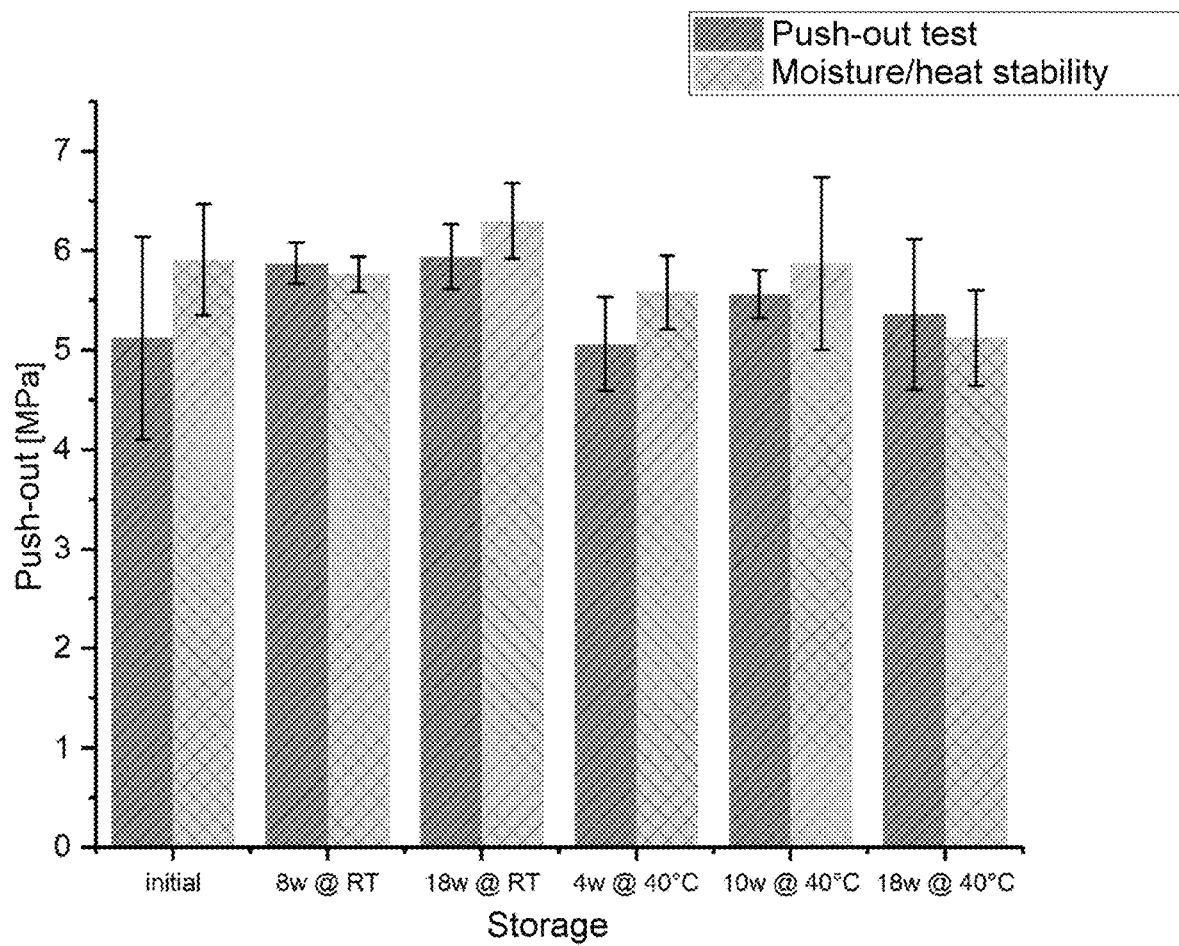
FIG. 1 is a plot of push-out results of example adhesive films bonded to substrates after storage under various conditions and after storage under various conditions with an additional moisture and heat exposure, according to embodiments of the disclosure.

Accordingly, the invention relates to an adhesive film comprising at least one layer of an adhesive, wherein the adhesive comprises a polymer component and at least one peroxide, wherein the polymer component comprises at least 50% by weight of those thermoplastic polymers having no C=C double bonds and no C≡C triple bonds.

Peroxides chosen are those for which the 1 minute half-life temperature $T(t_{1/2}=1\text{ min})$ in solution (0.1 molar in monochlorobenzene) does not exceed 200° C., preferably not exceeding 190° C., very preferably not exceeding 180° C.

The peroxides are especially those which—apart from satisfying the above definition—also bear an organyl group on each oxygen atom. Peroxides used are accordingly compounds of the general structure R—O—O—R' where the R and R' radicals are organyl groups that may be chosen independently or else be identical, and where R and R' may also be bonded to one another, so as to form a cycle via the peroxy group (—O—O—), resulting in a structure of the

type.

Organyl groups refer to organic radicals—irrespective of which functional group is present therein—having one or less often more free valences on one carbon atom. Examples of these are acetonyl groups, acyl group (for example acetyl groups, benzoyl groups), alkyl groups (for example methyl groups, ethyl groups), alkenyl group (for example vinyl groups, allyl groups), alkynyl groups (propargyl groups), aminocarbonyl groups, ampicilloyl groups (radicals derived from ampicillin), aryl groups (for example phenyl groups, 1-naphthyl groups, 2-naphthyl groups, 2-thiophenyl groups, 2,4-dinitrophenyl groups), alkylaryl groups (for example benzyl groups, triphenylmethyl groups), benzyloxycarbonyl groups (Cbz), tert-butoxycarbonyl groups (Boc), carboxy groups, (fluoren-9-ylmethoxy)carbonyl groups (Fmoc), furfuryl groups, glycidyl groups, haloalkyl groups (for example chloromethyl groups, 2,2,2-trifluoroethyl groups), indolyl groups, nitrile groups, nucleosidyl groups, trityl groups, to name just a few.

Peroxides of the general structure R—O—O—R' (including in cyclic form) have the advantage, for example, by comparison with the hydroperoxides that they do not eliminate water in the manner of primary cleavage products on thermal activation of the adhesive composition. What is desired in accordance with the invention is the greatest possible reduction in, preferably complete avoidance of, volatile constituents having boiling points above 150° C., preferably having boiling points above 120° C., in order especially to avoid blistering at the bonding site and hence weakening thereof. Accordingly, R and R' in the peroxides of the invention should especially preferably be chosen such that these do not lead to formation of volatile primary cleavage products either—for example carbon dioxide, isopropanol.

The adhesive films of the invention have excellent prelaminatability and have been found to be activatable in the hot compression step to develop the ultimate bond strength, meaning that they have the ability to react chemically, especially in a rapid crosslinking and/or curing reaction, after appropriate activation. The activation is especially effected thermally, i.e. by supply of heat. In principle, other activation methods—for example by induction, by microwaves, by irradiation with UV radiation, laser treatment, plasma treatment—are also known for latently reactive adhesive tapes. For the purposes of the present invention, however, the activation very preferably takes place by supply of thermal energy, and the further activation methods may especially be used and optionally additionally (additively), for instance by mixing UV photoinitiators into the adhesive. This is a particular execution of the invention, but not the general case.

During the supply of heat, the adhesive melts and can excellently wet the substrate surfaces to be bonded, and the crosslinking or curing reaction results in an increase in cohesion of the adhesive. This is achieved by use of thermoplastic base polymers.

By virtue of the reactive bonding, the adhesive films of the invention are thus capable of generating high bond strengths to the substrates on which they are bonded. The bond strengths here may assume for example orders of magnitude that exceed those of customary pressure-sensitive adhesive compositions by a factor of 10 or more.

The adhesives used in accordance with the invention and the corresponding adhesive films are latently reactive. "Latently reactive" in the context of this invention refers to those activatable adhesive systems that can be stored in a stable manner over prolonged periods without activation. Latently reactive adhesive films are those that do not cure, or cure only over a period of months, under standard climatic conditions (23° C. [296.15 K]; 50% RH) and especially at elevated storage temperatures (especially up to 40° C. [316.15 K]) and hence are storage-stable, but which are activatable and cure and/or crosslink at much higher temperatures. Latent reactivity offers the advantage that these adhesive films can be stored, transported and processed further (for example configured) under standard climatic conditions and especially at elevated temperatures up to 40° C. before they are then used and cured at the bonding site. There should be no significant change in the adhesives during the storage time, such that there is no significant difference in the bonding properties of an adhesive system freshly employed after the establishment of the bond and of an adhesive system employed after prolonged storage for otherwise comparable bonding.

It is a feature of the compositions of the invention that they are firstly latently reactive and secondly rapidly curable at elevated temperature.

Adhesive Components

According to the invention, the at least one peroxide, or the multiple peroxides used, is chosen such that it has comparatively high breakdown rates or short half-lives $[t_{1/2}]$ at elevated temperatures—temperatures above their activation temperature. The breakdown rate of the peroxides is a characterizing criterion for the reactivity thereof and is quantified by the reporting of the half-lives at particular temperatures $[t_{1/2}(T)]$, where the half-life, as usual, is the time after which half of the peroxide has broken down under the given conditions. The higher the temperature, in general, the shorter the half-life of breakdown. Thus, the higher the breakdown rate, the shorter the half-life.

The half-life temperature [$T(t_{1/2})$] refers to the temperature at which the half-life corresponds to a given value; for example, the 10 hour half-life temperature [$T(t_{1/2}=10\text{ h})$] is the temperature at which the half-life of the substance examined is just 10 hours, the 1 minute half-life temperature [$T(t_{1/2}=1\text{ min})$] is that temperature at which the half-life of the substance examined is just 1 minute, and so forth.

According to the invention, the person skilled in the art would not have expected it to be possible to utilize peroxides in accordance with the invention, since the demands on sufficient storage stability at low and at moderately elevated temperatures (i.e. very minor breakdown, see also below) but sufficiently significant breakdown at the compression temperature (i.e. the activation of the adhesive film) and hence the provision of adequate reactivity in the curing of the adhesive film are fundamentally at odds. However, it has been able to be found that the use of the peroxides utilized in accordance with the invention was successful and it was additionally possible to provide products stable to heat and moisture.

In the context of this invention, the at least one peroxide, or the multiple peroxides used, is chosen such that the 1 minute half-life temperature $T(t_{1/2}=1\text{ min})$ in solution does not exceed 200° C., preferably does not exceed 190° C., very preferably does not exceed 180° C.

The above condition is considered to be satisfied especially when the peroxide in question has a corresponding half-life temperature at least in monochlorobenzene (0.1 molar solution).

Such half-lives can be ascertained experimentally (determination of concentration by means of DSC or titration) and can also be found in the relevant literature. The half-lives are also obtainable by calculation from the Arrhenius frequency factor constant and breakdown activation energy constant for the respectively specified conditions that are specific to the respective peroxide. The following relationships set forth in Equations [1] to [4] are applicable:

$$-dc/dt = k \cdot c \quad [1]$$

$$\ln(c_t/c_0) = -k \cdot t \quad [2]$$

$$t_{1/2} = \ln 2 / k \text{ for } c_t(t_{1/2}) = c_0/2 \quad [3]$$

$$k = A \cdot e^{-Ea/RT} \quad [4]$$

where $c_0$=starting concentration
$c_t$=concentration at time t
$c_t(t_{1/2})$=concentration at half-life
$t_{1/2}$=half-life
k=breakdown constant
A=Arrhenius frequency factor
Ea=activation energy for peroxide breakdown
R=universal gas constant (R=8.3142 J/(mol·K))
T=absolute temperature The half-lives specified in this document and the half-life temperatures are each based on a 0.1 molar solution of the corresponding peroxide in monochlorobenzene, unless stated otherwise in the individual case.

Using the Arrhenius frequency factor constant and breakdown activation energy constant that can be found by searching for the respective conditions—for instance the solvent used—or can be calculated from values that can be found by searching, it is possible to convert the half-lives and the half-life temperatures to other conditions in each case—for instance in different solvents—and hence make them comparable.

With appropriate choice of the peroxides, it has been possible to crosslink even saturated thermoplastic polymer systems in spite of good latency—i.e. storage stability without significant crosslinking or curing under storage conditions with temperatures up to 40° C. More particularly, it was not to be expected here that with the peroxides used in accordance with the invention, especially dicumyl peroxide, as crosslinkers for saturated thermoplastic polymers lacking C—C multiple bonds, it is possible to create latently reactive adhesive films having particularly positive properties that are even superior to those systems that are hot-curable via reactive groups. Correspondingly, the invention can provide the advantage arising from the hotmelt properties of the thermoplastic polymer systems, in combination with the possibility of excellent crosslinking of the polymer by means of peroxide in spite of the absence of free-radically reactive groups.

Preference is given to using those peroxides that additionally have high half-lives at moderate temperatures—especially those well below their activation temperatures. It is thus possible to achieve good latency characteristics, i.e. good storage stability, of the thermally activatable adhesive films comprising the peroxides. Correspondingly, the at least one peroxide, or the multiple peroxides used, is chosen such that its half-life is, or their half-lives are, at 80° C.—i.e., for instance, after a prelamination process—at least 13.5 hours, especially at least 22.5 hours, preferably at least 69 hours, especially preferably at least 700 hours. This makes it possible for the thermally activatable adhesive tape at 80° C. still to have sufficient processing and application time in that at least 95% of the peroxide originally used is still present after one hour (corresponding to t/2=13.5 h), especially still at least 97% (corresponding to t/2=22.5 h), preferably still at least 99% (corresponding to t/2=69 h), especially preferably still at least 99.9% of the peroxide used, and was thus not yet available for reaction.

In order to guarantee a storage-stable system, the half-life under customary storage conditions—that may typically, for instance, be up to 40° C.—should be high. Therefore, the peroxides used should preferably be chosen such that their half-life at the storage temperature, preferably up to 40° C., is sufficiently great that, after 9 months (274 days), at least 75%, preferably 85%, especially preferably 95% or very especially preferably more than 95% of the peroxide is still available for crosslinking. The corresponding half-lives can be ascertained by the relationships given above.

Peroxides suitable in accordance with the invention are, for example, representatives from the following groups: dialkyl peroxides, diacyl peroxides, peroxy esters, peroxydicarbonates, peroxy ketals, cyclic peroxides, for which the values mentioned in respect of 1 minute half-life temperature, preferably also in respect of half-life at 80° C., further preferably also in respect of half-life at 40° C., are achieved.

Listed by way of example hereinafter are some representatives for which this is true from the different groups that are usable advantageously in accordance with the invention: dialkylperoxides: di-tert-amyl peroxide, di-tert-butyl peroxide, tert-butyl cumyl peroxide, dicumyl peroxide, 2,5-dimethyl-2,5-di-(tert-butylperoxy)hexane, 2,5-dimethyl-2,5-di(tert-butylperoxy)-hexyne-3, di-(2-tert-butylperoxyisopropyl)benzene; diacyl peroxides: dibenzoyl peroxide, dilauroyl peroxide, diisobutyryl peroxide, didecanoyl peroxide, di(3,5,5-trimethylhexanoyl) peroxide;

ketone peroxides: acetylacetone peroxide, cyclohexanone peroxide, methyl ethyl ketone peroxide, methyl isobutyl ketone peroxide; peroxy esters: tert-butyl peroxyacetate, tert-butyl peroxybenzoate, tert-butyl peroxydiethylacetate, tert-amyl peroxy-2-ethylhexylcarbonate, tert-butyl peroxy-isopropylcarbonate, tert-butyl peroxy-2-ethylhexylcarbonate, tert-amyl peroxy-2-ethylhexanoate, tert-butyl peroxy-2-ethylhexanoate, 1,1,3,3-tetramethylbutyl peroxy-2-ethylhexanoate, tert-butylperoxy-3,5,5-trimethylhexanoate, tert-butylperoxyisobutyrate, tert-butyl monoperoxymaleate, tert-amyl peroxyneodecanoate, tert-butyl peroxyneodecanoate, cumene peroxyneodecanoate, 1,1,3,3-tetramethylbutyl peroxyneodecanoate, tert-butyl peroxyneoheptanoate, tert-amyl peroxypivalate, tert-butyl peroxypivalate, 1,1,3,3-tetramethylbutyl peroxypivalate, 2,5-dimethyl-2,5-di(2-ethylhexanoylperoxy)hexane; peroxydicarbonates: di-n-peroxydicarbonate, di(2-ethylhexyl) peroxydicarbonate, di-n-butyl peroxydicarbonate, dicetyl peroxydicarbonate, dimyristyl peroxydicarbonate, di(4-tert-butylcyclohexyl) peroxydicarbonate; peroxyketals: 1,1-di-(tert-butylperoxy)-3,3,5-trimethylcyclohexane, 1,1-di-(tert-butylperoxy)-cyclohexane, 2,2-di-(tert-butylperoxy)butane; and cyclic peroxides: 3,6,9-triethyl-3,6,9-trimethyl-1,4,7-triperoxonane.

Particularly advantageously in accordance with the invention, dicumyl peroxide (bis(1-methyl-1-phenylethyl) peroxide) is used, which has the following half-lives: 812 h at 80° C. (corresponding to less than 0.1% of the original amount of peroxide at 80° C. within one hour), 10 h at 112° C.; 1 h at 132° C.; 0.1 h=6 min at 154° C.; 1 min at 172° C.; all aforementioned values in solution (0.1 molar monochlorobenzene). Dicumyl peroxide is selected with particular preference since it can give particularly storage-stable and also moisture/heat-stable adhesive films. It is also possible to use two or more peroxides. In a preferred procedure, in that case, dicumyl peroxide is chosen as one of the two or more peroxides.

The peroxide(s) used, especially dicumyl peroxide, are—especially depending on their reactivity—preferably chosen in an amount that the resulting bond brought about with the adhesive film has the desired properties and especially satisfies the specifications defined below in the push-out tests (as a fresh sample at least 4 MPa, preferably even after defined moisture/heat storage at least 3 MPa, further preferably not more than 10% losses after storage under standard climatic conditions for six weeks, even further preferably not more than 10% losses even after storage and moisture/heat storage for six weeks; see the respective specifications further down for the details). In order to meet these demands, the amounts of peroxide—for example the amount of dicumyl peroxide—of not less than 0.5% by weight, advantageously not less than 1% by weight, particularly advantageously not less than 2% by weight, very particularly advantageously not less than 3% by weight, and of not more than 10% by weight, preferably not more than 8% by weight, very preferably not more than 7% by weight, have been found to be very advantageous.

Peroxides that do not meet the demands according to the present invention are, for example, a multitude of hydroperoxides, i.e. compounds of the general formula R—O—O—H in which R is an organyl group. The list of hydroperoxides that do not lead to the desired success in accordance with the invention includes, for example, cumene hydroperoxide, tert-butyl hydroperoxide, p-menthane hydroperoxide, 1,1,3,3-tetramethylbutyl hydroperoxide, tert-amyl hydroperoxide, diisopropylbenzene monohydroperoxide. It has been found in accordance with the invention that these hydroperoxides are incapable of developing good crosslinking within a sufficiently short processing time in the thermal activation of the adhesives, and of bringing about the desired advantages. Moreover, hydroperoxides under thermal stress can exude volatile primary cleavage products (see also above).

The adhesive further includes a polymer component that consists of a single polymer or is composed of multiple polymers. At least one of the polymers that form the polymer component is a thermoplastic polymer having no carbon-carbon double bonds, i.e. is a saturated polymer. Saturated thermoplastic polymers account for at least 50% by weight of the polymer component and may amount up to 100% by weight of the polymer component, such that said polymer component is formed in the latter case exclusively by one or more saturated thermoplastic polymers. If just one thermoplastic polymer is present, it is present in the polymer component at from 50% by weight to 100% by weight.

The adhesive here in the first embodiment variant may be composed exclusively of the polymer component and the peroxide(s).

Very preferably, polymers used are those having a glass transition temperature of not more than −25° C., especially preferably not more than −35° C. All glass transition temperature figures in the context of this document relate to the determination of the static glass transition temperature TG by means of dynamic differential calorimetry (DSC) to DIN 53765, specifically to the glass transition temperature value Tg to DIN 53765:1994-03, unless stated otherwise in the individual case. Low glass transition temperatures of the polymers used had advantageous effects on good shock resistance properties of the composites produced with the corresponding adhesive films.

Suitable saturated thermoplastic polymers may advantageously be chosen from the group of the polyolefins (for example ethylene-vinyl acetate copolymers (EVA)), the polyethers, the copolyethers, the polyesters, the copolyesters, the polyamides, the copolyamides, the polyacrylic esters, the acrylic ester copolymers, the polymethacrylic esters, the methacrylic ester copolymers, the thermoplastic polyurethanes and chemically or physically crosslinked substances formed from the aforementioned compounds. Furthermore, it is also possible to use blends of various thermoplastic polymers, especially from the above compound classes. Particular preference is given to using semicrystalline thermoplastic polymers.

Preferred examples are polyolefins—especially semicrystalline polyolefins. Preferred polyolefins are prepared from ethylene, propylene, butylene and/or hexylene, it being possible to polymerize the pure monomers in each case or to copolymerize mixtures of the monomers mentioned. It is possible through the polymerization method and through the selection of monomers to control the physical and mechanical properties of the polymer, for example the softening temperature and/or specific mechanical properties.

Thermoplastic polymers used may preferably be thermoplastic elastomers, alone or else in combination with one or more thermoplastic polymers from the aforementioned compound classes. Particular preference is given to using saturated semicrystalline thermoplastic elastomers.

Particular preference is given to thermoplastic polymers having softening temperatures lower than 100° C. In this connection, the term "softening point" represents the temperature from which the granular thermoplastic sticks to itself. It is advantageously a feature of semicrystalline thermoplastic polymers that they have not only their softening temperature (which correlates with the melting of the crystallites)—especially as characterized above—but also a glass transition temperature of not more than 25° C.

Very advantageous examples of thermoplastic elastomers in the context of the thermoplastic polymers are thermoplastic polyurethanes (TPU). Polyurethanes are polycondensates that are typically formed from polyols and isocyanates and contain soft and hard segments. The soft segments consist, for example, of polyesters, polyethers, polycarbonates, each preferably aliphatic in nature in the context of this invention, and hard polyisocyanate segments. According to the nature and use ratio of the individual components, it is possible to obtain materials that can be used advantageously in the context of this invention. Raw materials available to the formulator for this purpose are specified, for example, in EP 894 841 B1 and EP 1 308 492 B1.

In a preferred embodiment of the invention, a thermoplastic polyurethane lacking C—C multiple bonds is used. The thermoplastic polyurethane preferably has a softening temperature of less than 100° C., especially less than 80° C.

In a further preferred embodiment of the invention, a mixture of two or more saturated thermoplastic polyurethanes is used. The mixture of the thermoplastic polyurethanes preferably has a softening temperature of less than 100° C., especially less than 80° C.

In a particularly preferred embodiment of the invention, Desmomelt® 530 is used as saturated thermoplastic polymer. Desmomelt® 530 is a largely linear, thermoplastic, highly crystallizing polyurethane elastomer commercially available from Covestro AG (formerly Bayer MaterialScience AG). Desmomelt can also be used together with other polymers—especially saturated thermoplastic polymers, preferably further saturated thermoplastic polyurethanes.

In a preferred execution of the invention, at least one adhesion-boosting additive—also referred to as adhesion promoter—is added to the adhesive. Adhesion promoters are substances that improve the bonding force of the adhesive film on the substrate to be bonded. This can especially be accomplished by an increase in the wettability of the substrate surfaces and/or the formation of chemical bonds between the substrate surface and the adhesive or components of the adhesive.

An advantageous execution of the invention relates to an adhesive composed exclusively of the polymer component, the peroxides and the adhesion promoter—the latter especially in the form of the silanes described hereinafter, and here especially in such a way that the polymer component used is exclusively one or more saturated thermoplastic polymers—especially semicrystalline saturated thermoplastic polymers.

Adhesion promoters used may advantageously be silane adhesion promoters. Silane adhesion promoters utilized are especially compounds of the general form $RR'_aR''_bSiX_{(3-a-b)}$ where R, R' and R" are chosen independently and each denote a hydrogen atom bonded to the silicon atom or an organic functionalized radical bonded to the silicon atom, X denotes a hydrolyzable group, a and b are each 0 or 1, and where R, R' and R" or two representatives from this group may also be identical.

Adhesion promoters utilized may also be compounds in which, in the presence of multiple hydrolyzable groups, X are not identical but differ from one another [corresponding to the formula $RR'_aR''_bSiXX'_cX''_d$ with X, X', X" as independently chosen hydrolyzable groups (of which it is again alternatively possible for two to be identical), c and d are each 0 or 1, with the proviso that a+b+c+d=2].

Hydrolyzable groups utilized are especially alkoxy groups, such that alkoxysilanes in particular are used as adhesion promoters. The alkoxy groups of a silane molecule are preferably the same, but they may in principle also be chosen differently. Alkoxy groups chosen are, for example, methoxy groups and/or ethoxy groups. Methoxy groups are more reactive than ethoxy groups. Methoxy groups may therefore have a better adhesion-promoting effect through faster reaction with the substrate surfaces and it may therefore be possible to reduce the amount used. Ethoxy groups, by contrast, have the advantage of having a smaller influence (possibly a negative one) on the processing time owing to their lower reactivity, especially also with regard to the desired moisture/heat stability.

Adhesion promoters used with preference are: trialkoxysilanes $R-SiX_3$. Examples of trialkoxysilanes suitable in accordance with the invention are trimethoxysilanes—such as N-(2-aminoethyl)-3-aminopropyltrimethoxysilane, N-cyclohexyl-3-aminopropyltrimethoxysilane, 3-aminopropyltrimethoxysilane, 3-ureidopropyltrimethoxysilane, vinyltrimethoxysilane, 3-glycidoxypropyltrimethoxysilane, 3-methacryloyloxypropyl-trimethoxysilane, methacryloyloxymethyltrimethoxysilane, N-methyl-[3-(trimethoxysilyl)propyl]carbamate, N-trimethoxysilylmethyl-O-methylcarbamate, tris[3-(trimethoxysilyl)propyl] isocyanurate, 3-glycidoxypropyltrimethoxysilane, methyltrimethoxysilane, isooctyltrimethoxysilane, hexadecyltrimethoxysilane, 3-mercaptopropyltrimethoxysilane, 3-aminopropyltrimethoxysilane, N-(2-aminoethyl)-3-aminopropyltrimethoxysilane, N-phenyl-3-aminopropyltrimethoxysilane, N-ethyl-3-aminoisobutyltrimethoxysilane, bis[3-(trimethoxysilyl)propyl]amine, 3-isocyanatopropyltrimethoxysilane, 2-(3,4-epoxycyclohexyl)ethyl-trimethoxysilane; 3-methacryloyloxypropyltrimethoxysilane, 3-methacrylamidopropyl-trimethoxysilane, p-styryltrimethoxysilane, 3-acryloyloxypropyltrimethoxysilane, N-(vinylbenzyl)-2-aminoethyl-3-aminopropyltrimethoxysilane hydrochloride, triethoxysilanes—such as N-cyclohexylaminopropyltriethoxysilane, 3-aminopropyl-triethoxysilane, 3-ureidopropyltriethoxysilane, 3-(2-aminomethylamino)propyltriethoxysilane, vinyltriethoxysilane, 3-glycidoxypropyltriethoxysilane, methyltriethoxysilane, octyltriethoxysilane, isooctyltriethoxysilane, phenyltriethoxysilane, 1,2-bis(triethoxysilane)ethane, 3-octanonylthio-1-propyltriethoxysilane; 3-aminopropyltriethoxysilane, bis[3-(triethoxysilyl)propyl]amine, 3-isocyanatopropyltriethoxysilane, 2-(3,4-epoxycyclohexyl)ethyltriethoxysilane, 3-methacryloyloxypropyltriethoxysilane, 3-methacrylamidopropyltriethoxysilane, 3-triethoxysilyl-N-(1,3-dimethylbutadiene)propylamide, triacetoxysilanes—such as vinyltriacetoxysilane, 3-methacryloyloxypropyltriacetoxysilane, triacetoxyethylsilane, and mixed trialkoxysilanes—such as 3-methacrylamidopropylmethoxydiethoxysilane, 3-methacryl-amidopropyldimethoxyethoxysilane.

Examples of dialkoxysilanes suitable in accordance with the invention are: dimethoxysilanes—such as N-(2-aminoethyl)-3-aminopropylmethyldimethoxysilane, vinyldimethoxymethylsilane, (methacryloyloxymethyl)methyldimethoxysilane, methacryloyloxymethylmethyldimethoxysilane, 3-methacryloyloxypropylmethyldimethoxysilane, dimethyldimethoxysilane, (cyclohexyl)methyldimethoxysilane, dicyclopentyldimethoxysilane, 3-glycidoxypropylmethyldimethoxysilane, 3-mercaptopropylmethyldimethoxysilane, diethoxysilanes—such as dimethyldiethoxysilane, gamma-aminopropylmethyldiethoxysilane; 3-glycidoxypropylmethyldiethoxysilane, and 3-methacryloyloxypropylmethyldiethoxysilane. One example of a monooxysilane is trimethyloxysilane.

The amount of added adhesion promoters may in principle be chosen within a wide range, according to the desired properties of the product and taking account of the raw materials chosen for the adhesive film. However, it has been found to be very advantageous in accordance with the invention when the amount of the adhesion promoter used, based on the adhesive used, is in the range from 0.5% to 20% by weight, preferably in the range from 1% to 10% by weight, especially preferably from 1.5% to 5% by weight, very especially preferably in the range from 2.5% to 3.5% by weight.

Very high amounts of adhesion promoters used can have a strong plasticizing effect, such that it can be advantageous—especially with regard to adequate stability of films—to choose as small an amount as possible of adhesion promoter such that the desired positive effect on moisture/heat stability is sufficiently large on the one hand, without having an adverse effect on the properties of the adhesive film with regard to dimensional stability and stability thereof on the other hand.

Adhesive Films

The adhesive of the invention in layer form more preferably forms an adhesive film or is—alongside one or more further layers—part of an adhesive film. The invention thus also encompasses adhesive films composed of the adhesive of the invention and adhesive films comprising a layer of the adhesive of the invention.

The adhesive films of the invention may be of single-layer construction—i.e. composed solely of the layer of the parent adhesive—or else of multilayer construction, for instance provided with a reinforcing or carrier layer. Single-layer systems are advantageous, called transfer adhesive tapes.

Carriers utilized may in principle be any layers composed of the materials suitable for the purpose that are known to those skilled in the art, according to the desired properties of the product and stability in the thermal activation. For example, it is possible to use carrier material such as textile materials, weaves, nonwovens, papers, polymer films, for example mono- or biaxially stretched, optionally oriented polyolefins, polyvinylchloride films (PVC), polypropylene films, polyethylene (PE) films, such as HDPE and LDPE films, polyethylene terephthalate films (PET), polylactide films, and foams and weaves. Carrier materials may have high or low extensibility and/or flexibility and be chosen, for example, to be tear-resistant or slightly tearable. Carriers utilized may in principle be especially cohesive rubber films or adhesive composition layers that are likewise suitable, for instance pressure-sensitive adhesives or activatable adhesives that provide appropriate intrinsic stability and meet the demands on the bonding conditions for the adhesive films.

The adhesive films may be covered with a protective material on one or both sides, called "liners". Liners serve for temporary protection and for handling of the adhesive tape and are removed again for the application. In the context of the present invention, such liners are considered to be procedural aids, but not to be an actual part of the adhesive films of the invention. Liners may be paper or films, equipped with a release agent at least on the side facing the adhesive film of the invention. The papers or films in question may thus also have been modified to be slightly pressure-sensitively adhesive (called tacky liners).

According to the invention, it is also possible to provide laminate adhesive tapes, i.e. adhesive tapes composed of a multitude of adhesive layers arranged one on top of another. Laminates are advantageous, for example, when thicker carrier-free adhesive tapes are to be produced by simple processes, since it is generally simpler to produce thin adhesive layers and then to laminate them with one another than to coat adhesive layers of the resulting total thickness directly to give a uniform homogeneous product.

Adhesive layers, transfer adhesive tapes and laminate adhesive tapes of the invention may be configured from very thin designs—in the region of a few micrometers—up to very thick layers—in the region of several centimeters. Accordingly, multilayer adhesive tapes—especially also those that comprise further layers as well as the adhesive layers—may vary in their thickness resulting from the respective thickness of the adhesive layers—as described above—and of the further layers used, such as carrier layers, pressure-sensitive adhesives, functional (e.g. thermally or electrically conductive) layers, primer layers and the like.

Typical layer thicknesses for single-layer adhesive films of the invention are in the range from 1 to 250 μm, for example 5, 20, 25, 50, 75, 100, 125, 150, 175 or 200 μm. Correspondingly higher layer thicknesses are possible in the case of laminate adhesive tapes, for example in the range from 5 μm to 5 mm or even more.

The adhesive films of the invention are self-supporting and hence independent products, meaning that they can be readily stored, transported and applied. This distinguishes them significantly from "adhesive films" composed of liquid adhesives, i.e. adhesive layers that exist only after they have been applied to the respective substrate to be bonded, where they are solidified in the course of their application in use, but are not removed again from the substrate as an independent product. For instance, adhesive films of the invention can be wound up together to give a roll or supplied as sections, blanks or die-cuts. Accordingly, the invention also provides any blanks and die-cuts of adhesive films of the invention.

The adhesive films of the invention have a very broad application window in order to achieve bonds having the desired qualities. Compared to those adhesive films activatable at low temperatures as disclosed by the prior art—cf., for instance, WO 93/25599 A and DE 10 2010 013 145 A—it is possible to achieve very much shorter cycle times, at the limits of which the prior art adhesive films no longer lead to the required performance.

Effective bonding by means of the adhesive films with activation thereof means an interaction of temperature, time (cycle time); the lower the level chosen for one of the parameters, the higher the level that can or has to be chosen for another parameter. With higher temperatures, it is possible, for instance, to achieve shorter cycle times. If the cycle time can be extended, it is possible to work at lower temperature.

The compression pressure in this connection is primarily a process parameter and is dependent on the raw materials used in the formulation, in combination with the cycle time. For instance, an elevated pressure can promote adaptation to the substrates and the wetting of the substrates in the case of formulations having elevated melt viscosity in combination with short cycle times. In the case of formulations having a relatively low melt viscosity, especially in combination with relatively long cycle times, a lower pressure may be advantageous in order to avoid unwanted "oozing" of the adhesive out of the bonded joint. For the advantageous and inventive formulations ascertained here, it was advantageously possible, for example, to work with a compression pressure of 10 bar, although the invention is not limited to this compression pressure.

Particularly the contact time in the activation of the adhesive film (the activation time) can be considerably reduced by possible variations in the other parameters within the parameter limits available, which arise from the stability of the substrates to be bonded.

In principle, the maximum permitted temperature is determined by the substrates to be bonded. For many of the desired applications (for instance the bonding of plastics and/or anodized substrates), the temperature chosen should not be higher than 200° C. in order not to damage the substrates. It is fundamentally the case here that the higher the temperature chosen, the shorter cycle time should be, in order to expose the substrates to a minimum damaging heat exposure. According to the invention, it has been possible to reduce the cycle time to less than 10 s at a temperature of 200° C., and to 10 s at 190° C. (pressure 10 bar in each case). At temperatures below 170° C., by contrast, maximum cycle times of up to one minute, advantageously up to 30 s, may be acceptable. In general, a minimum cycle time at a maximum possible temperature, depending on the sensitivity of the substrates to be joined, is advantageous in order to increase productivity in the processing operation.

The adhesive films of the invention have good storability without losing their positive properties as adhesive films. More particularly, it has been found that the adhesive films of the invention, even after storage for six weeks, are capable of establishing bond strengths to a substrate that are still at least 90% of the bond strengths of the freshly produced adhesive films—which have especially been stored for not longer than one day.

Moreover, it has been found that the adhesive films of the invention provide a further advantage: the bonds by means of latently reactive adhesive films—including those based on polyurethane—according to the prior art, as described, for instance, in the already cited WO 93/25599 A and DE 10 2010 013 145 A, regularly have limited stability under moist/hot conditions. This is connected to the fact that moisture is capable of penetrating into the adhesive bond between substrate surface and adhesive film with time and hence weakens the adhesive bond. The adhesive films of the invention, by contrast, can achieve bonds that have excellent stabilities under moist/hot conditions even over a prolonged period of time.

Moisture/heat stability can be optimized in that one or more adhesion promoters are added to the adhesive which is utilized for production of the latently reactive adhesive film of the invention. Adhesion promoters used here may be substances that improve the adhesion of the adhesive film to the substrate surface.

A quantitative criterion for the bonding properties of an adhesive film is considered to be what is called the push-out test in particular. For the push-out test, a substrate in disk form is bonded to a second substrate in frame form with an adhesive film sample and then the force that has to be applied in order to separate the two substrates from one another again is ascertained (cf. the further details further down in this document; Test Method A).

In a preferred manner, the adhesive films of the invention have good bond strength. The bond strength is quantified by the result of the push-out test. Preferably, the adhesive films of the invention, as a fresh sample (freshly-coated adhesive film after drying at 70° C. for 30 min in a suitable air circulation drying cabinet and subsequent conditioning under standard climatic conditions (23° C./50% RH) for 24 h), have, in the push-out test (measurement of force to part an adhesive bond of a polycarbonate disk (Makrolon 099) with a frame made of anodized aluminum (E6EV1) by means of a layer of the adhesive film to be examined, of thickness 100 μm, with an effective bond area of 282 mm$^2$ [for further details see also tests A and B]) a force value of at least 3 MPa, preferably at least 4 MPa, preferably after bonding under the Bonding Condition I., further preferably also by the Bonding Condition II., and even further preferably also under the Bonding Condition III. Bonding Condition I. is as follows: pre-lamination 70° C., 15 s; final bonding (compression conditions) 190° C., 10 s; 10 bar; conditioning of the adhesive bond at 23° C. for 24 h/50% RH [RH stands for relative humidity]; and testing in each case at 23° C., 50% RH. Bonding Condition II. is as follows: pre-lamination 70° C., 15 s; final bonding (compression conditions) 180° C., 12 s; 10 bar; conditioning of the adhesive bond at 23° C. for 24 h/50% RH; and testing in each case at 23° C., 50% RH. Bonding Condition III. is as follows: pre-lamination 70° C., 15 s; final bonding (compression conditions) 170° C., 30 s; 10 bar; conditioning of the adhesive bond at 23° C. for 24 h/50% RH; and testing in each case at 23° C., 50% RH.

In a further very preferred manner, the adhesive films of the invention additionally have good moisture/heat stability. For quantification of moisture/heat stability, it is likewise possible to employ the push-out test, specifically after defined storage (72 h at 85° C. and 85% RH) of the adhesive bond to be examined, established by means of the adhesive film of the invention. The details of this test are described in detail in the experimental section below (Test Methods A and B).

The adhesive films of the invention have, in the push-out test, even after moist/hot storage (measurement of force to part an adhesive bond of a polycarbonate disk (Makrolon 099) with a frame made of anodized aluminum (E6EV1) by means of a layer of the adhesive film to be examined, of thickness 100 μm, with an effective bond area of 282 mm$^2$), a force value of at least 3 MPa, preferably in all three cases by bonding under the aforementioned Bonding Conditions I., II. and III.

In addition—in combination with the aforementioned minimum values—the bond strength—meaning the aforementioned push-out force value—of the adhesive bond that has been stored under moist/hot conditions should preferably be more than 50% of the adhesive bond that has not been stored under moist/hot conditions; more preferably, the bond strength of the adhesive bond stored under moist/hot conditions should be more than 75% of the adhesive bond not stored under moist/hot conditions; and very preferably, the bond strength of the adhesive bond stored under moist/hot conditions should be more than 90% of the adhesive bond not stored under moist/hot conditions or even exceeds the value of the bond not stored under moist/hot conditions.

Latently reactive adhesive systems refer to those activatable adhesives that are storable in a stable manner over prolonged periods of time without activation. Preferred latently reactive adhesive films are those that do not cure, or cure only over a period of months, under standard climatic conditions (23° C. [296.15 K]; 50% RH) and hence are storage-stable, but which—for example at much higher temperatures—are activatable (cf. also the "latency" test in the experimental) and cure and/or crosslink. The latent reactivity offers the advantage that these adhesive films can be stored, transported and processed further (for example configured) under standard climatic conditions before they then arrive at the bonding site and are cured.

The adhesives here should not change significantly during the storage time, such that there is no material difference in the bonding properties of an adhesive system employed freshly after the establishment of the bond and of an adhesive system employed after prolonged storage for otherwise comparable bonding. The latent reactivity (also referred to as latency in the context of the document) of the adhesive films can also be quantified via the push-out test.

For the purposes of the present document, adhesive films are considered to be latently reactive especially when an adhesive film sample stored after 18 weeks a) under standard laboratory conditions (23° C. [296.15 K]; 50% RH), preferably also an adhesive film sample stored b) at 40° C. in a suitable commercial air circulation drying cabinet (drying cabinet under standard climatic conditions), by comparison with otherwise identical fresh sample in the push-out test (measurement of force to part an adhesive bond of a polycarbonate disk (Makrolon 099) with a frame made of anodized aluminum (E6EV1) by means of a layer of the adhesive film to be examined at an effective bonding area of 282 mm$^2$), has not more than 10% losses, preferably in all three cases after bonding under the aforementioned Bonding Conditions I., II. and Ill.

Further preferably, the adhesive films are also stable in relation to moisture/heat characteristics, i.e. have, in the push-out test of the adhesive bond, even after prolonged storage of the adhesive film prior to establishment of the bond [at least after storage a) for 18 weeks under standard laboratory conditions (23° C. [296.15 K]; 50% RH), preferably also after alternative storage b) at 40° C. in a suitable commercial air circulation drying cabinet (drying cabinet under standard climatic conditions)], and after further moisture/heat storage (72 h at 85° C. and 85% RH) of the adhesive bond established, only admissible variances from the corresponding values for an adhesive bond of adhesive films stored correspondingly but without moisture/heat storage of the composite.

The adhesive films after prolonged storage are also considered to have moisture/heat stability—in accordance with criteria already specified above—when the bond strength of the adhesive bond stored under moist/hot conditions is more than 50% of the adhesive bond not stored under moist/hot conditions, and to have good moisture/heat stability when the bond strength of the adhesive bond stored under moist/hot conditions is more than 75% of the adhesive bond not stored under moist/hot conditions, and to have very good moisture/heat stability when the value of the bond strength of the composite stored under moist/hot conditions exceeds at least 90% of the value of the unstored sample. The determination of bond strength corresponds here to the push-out test already specified.

The adhesive films of the invention are suitable in principle for bonding of all substrates, both of rigid and of flexible materials. The substrates to be bonded may have various configurations, thicknesses and the like. Examples here include glass, all kinds of plastics, metal, ceramic, textiles, all kinds of materials, artificial leather . . . in each case with the same material and also with one another.

It is optionally possible to add tackifier resins to the adhesive used for the adhesive films of the invention. The term "tackifier resin" is understood by the person skilled in the art to mean a resin-based substance that further increases bond strength. Tackifiers used may be the standard tackifier resins, for example hydrocarbon resins, polyterpene resins and terpene-phenol resins, and also rosin and rosin derivatives. Formulation is in accordance with the general rules. Reference is made to the description of the state of knowledge relating to tackifier resins in the "Handbook of Pressure Sensitive Adhesive Technology" by Donatas Satas (van Nostrand, 1989) (chapter 25). Any combinations of these or other tackifier resins may be used in order to adjust the properties of the resulting adhesive and of the adhesive films obtainable therefrom as desired.

The adhesive may additionally contain further formulation constituents. Examples of these include fillers and/or additives, for example thermally and/or electrically conductive additives, pigments, dyes, catalysts, aging stabilizers, light stabilizers, processing auxiliaries and further substances for establishment of specific adhesive properties, although this enumeration should not be considered to be conclusive.

EXPERIMENTAL

The test methods described hereinafter are used to evaluate the adhesive film samples of the invention and the comparative samples.

Push-Out Test (Test Method A):

The push-out test enables conclusions as to the bond strength of an adhesive product in the direction of the adhesive layer normal. The following are provided: a circular first substrate (1) (polycarbonate, Macrolon 099, thickness 3 mm) with diameter 21 mm, a second substrate (2) (anodized aluminum, E6EV1, thickness 1.5 mm)—for example square with side length 40 mm—with a circular opening disposed in the center (bore) of diameter 9 mm, and the adhesive film sample to be examined, likewise in circular configuration with diameter 21 mm (cut to size or punched).

The three aforementioned components are used to establish a test specimen by pre-laminating the adhesive product with the open surface accurately fitting the substrate (1) (at 70° C. for 15 s). Then the temporary carrier is removed and this composite is concentrically pre-laminated by the now exposed side of the adhesive product onto the substrate (2) (likewise at 70° C. for 15 s), i.e. in such a way that the circular cutout of the substrate (2) is arranged exactly in the middle above the circular first substrate (1) (bonding area thus 282 mm$^2$). It is ensured that the total thermal contact time (70° C.) in the pre-lamination process does not exceed 30 s. Subsequently, the overall composite is compressed thermally under pressure, giving rise to the test specimen. The compression conditions are specified in the evaluation.

After the compression, the test specimens are stored (reconditioned) at 23° C. and 50% relative humidity (RH) (standard climatic conditions) for 24 h.

The testing is effected as follows: a tensile tester is equipped with a cylindrical ram (steel, diameter 7 mm) and the test specimen is clamped into a holder of the tensile tester above substrate (2), such that substrate (1) is held solely by the adhesive bond and can be detached through sufficient pressure by parting of the bond. The sample is fixed in such a way that bending of substrate (2) which is possible by application of force during the testing is minimized. The cylindrical ram pushes perpendicularly through the hole in substrate (2) (i.e. parallel oppositely to the normal vector of the adhesive product surface) and centrally onto the exposed area of the adhesive product at a constant speed of 10 mm/s; the tests take place under standard climatic conditions (23° C. at 50% RH).

The force recorded is that at which the bond fails and substrate (1) is parted from substrate (2) (parting of the adhesive bond, apparent from the abrupt pressure drop). The force is normalized to the bond area (N/mm$^2$ or MPa). Owing to the naturally high scatter of the individual results, as a result of the adhesive failure that usually occurs (failure at the substrate-adhesive film interface), the arithmetic mean is calculated from three individual tests.

Moisture/Heat Stability (Test Method B):

Test specimen preparation and testing are effected analogously to the push-out test, except that the test specimens, after compression at 23° C. and 50% relative humidity (RH) (standard climatic conditions) for 24 h, are stored and then subjected while in the upright position (on one of the 40 mm longitudinal sides of the base plate) to moist/hot storage (at 85° C. and 85% RH for 72 h) and conditioned again prior to testing at 23° C. and 50% RH for 24 h.

Should substrate (1) slide off substrate (2) during the moist/hot storage (or the substrates recognizably slip with respect to one another), the sample has failed and moisture/heat stability is inadequate.

The abovementioned criteria for moisture/heat stability are employed as a scale (moisture/heat stability: push-out value of the adhesive bond stored under moist/hot conditions is more than 50% of the adhesive bond not stored under moist/hot conditions; good moisture/heat stability: push-out value of the adhesive bond stored under moist/hot conditions is more than 75% of the adhesive bond not stored under moist/hot conditions; very good moisture/heat stability: push-out value of the adhesive bond stored under moist/hot conditions is more than 90% of the adhesive bond not stored under moist/hot conditions or even exceeds the value of the composite not stored under moist/hot conditions).

Latency:

One portion of the latently reactive adhesive films is stored prior to the establishment of the bonded test specimens at 40° C. in a drying cabinet under standard climatic conditions for 18 w; another portion is stored under standard climatic conditions and then the push-out test and the moisture/heat stability are assessed. The abovementioned criteria for latency and moisture/heat stability are employed as a scale.

Process/Application Window:

The reactive adhesive films are assessed under various compression conditions (variation of cycle time=activation time and temperature) with regard to push-out performance. The process window is defined by a time-temperature window in which the push-out values ascertained vary by not more than 25% from the maximum push-out value ascertained. The maximum activation time actually achievable can extend beyond the maximum cycle time envisaged for establishment of the maximum value.

Shock Performance:

The heat-activatable adhesive film to be examined is used to bond a test specimen produced from substrates (1) and (2) as described under "push-out test" and under defined conditions using a hot press (see the individual measurements).

The pre-lamination to the polycarbonate disk (substrate (1); Makrolon 099, machined burr-free, diameter 21 mm, thickness 3 mm) takes place by means of a hotplate at 70° C.

The single-sided covered, heat-activatable adhesive film is placed onto the hotplate with the covered side downward.

The heating on the hotplate makes the heat-activatable films pressure-sensitive adhesive/tacky, and the substrate (1) can be pre-laminated onto the adhesive film with gentle applied pressure within 3 to 5 s, with the total period of thermal stress not exceeding 30 s. After cooling, the composite of substrate (1) and adhesive film is cut out very accurately with scissors.

Substrate (2) (base plate—40 mm×40 mm anodic aluminum sheet with a central burr-free bore diameter 9 mm, thickness 1 mm) is then placed onto the hotplate for pre-heating for 1-2 minutes and removed for pre-lamination.

The remaining liner is pulled off the substrate (1)-adhesive film composite and placed onto the preheated aluminum base plate (substrate (2)) in an exactly centered manner and fixed by means of gentle contact pressure. The finished pre-laminated test specimen is then pressed with a suitable laboratory press with appropriately set parameters (time, pressure, temperature), with introduction of heat through the aluminum base plate facing downward.

After the compression, the test specimens are conditioned at 23° C./50% relative humidity for 24 hours.

Immediately after storage, the adhesive bond is clamped to a sample holder in a way that the composite is aligned horizontally.

The test specimen is introduced into the sample holder with the polycarbonate disk (substrate (1)) downward. The sample holder is then inserted centrally into the envisaged receptacle of the DuPont Impact Tester. The impact head, of weight 360 g, is used in such a way that the circularly rounded impact geometry with the diameter of 5 mm lies centrally and flush against the bonding side of substrate (1).

A weight having a mass of 800 g guided on two guide rails is allowed to fall vertically from a height of 5 cm onto the composite composed of sample holder, sample and impact head in this arrangement (measurement conditions: 23° C., 50% relative humidity). The height from which the weight falls is increased in 5 cm steps until the impact energy introduced breaks the sample as a result of the impact stress and the polycarbonate disk (substrate (1)) becomes detached from the base plate (substrate (2)).

In order to be able to compare experiments with different samples, the energy is calculated as follows:

$$E[J] = \text{height [m]} * \text{mass of weight [kg]} * 9.81 \text{ kg/m}*\text{s}^2$$

Five samples per product are tested, and the energy average is reported as the index for impact resistance.

Instrument: DuPont Impact Tester (from Cometech, TAIWAN, Model QC-641)

EXAMPLES

Adhesive Films Examined

Commercially available products are used as obtainable in January 2018.

Desmomelt® 530 is a largely linear, thermoplastic, highly crystallizing polyurethane elastomer. Reference is made to the following product data sheet: Desmomelt® 530 product data sheet, 2016-01-19 edition, Covestro AG, Leverkusen.

Desmocoll® 530/1 and Desmocoll® 540/3 are likewise largely linear, thermoplastic, elastic hydroxy polyurethanes having significant tendency to crystallization, available from Covestro AG. The Desmocoll® 540/3 product has a higher crystallization rate and higher solution viscosity than the Desmocoll®530/1 product.

Example 1: 100% by weight of Desmomelt®530 (Covestro AG)

Example 2: 100% by weight of Desmocoll 530/1 (Covestro AG)

Example 3: 100% by weight of Desmocoll 540/3 (Covestro AG)

Example 4: 95% by weight of Desmomelt®530 (Covestro AG)

5% by weight of dicumyl peroxide (CAS 80-43-3)

Example 5: 95% by weight of Desmocoll 530/1 (Covestro AG)

5% by weight of dicumyl peroxide (CAS 80-43-3)

Example 6: 95% by weight of Desmocoll 540/3 (Covestro AG)

5% by weight of dicumyl peroxide (CAS 80-43-3)
Example 7: 92% by weight of Desmomelt®530 (Covestro AG)
  5% by weight of dicumyl peroxide (CAS 80-43-3)
  3% by weight of 3-methacryloyloxypropytriethoxysilane (CAS 21142-29-0)
Example 8: 92% by weight of Desmomelt®530 (Covestro AG)
  5% by weight of dicumyl peroxide (CAS 80-43-3)
  3% by weight of 3-methacryloyloxypropyltrimethoxysilane (CAS 2530-85-0)
Example 9: 92% by weight of Desmomelt®530 (Covestro AG)
  5% by weight of dicumyl peroxide (CAS 80-43-3)
  3% by weight of [3-(2,3-epoxypropoxy)propyl]triethoxysilane (CAS 2602-34-8)
Example 10: 92% by weight of Desmomelt®530 (Covestro AG)
  5% by weight of dicumyl peroxide (CAS 80-43-3)
  3% by weight of 2-(3,4-epoxycyclohexyl)ethyltriethoxysilane (CAS 10217-34-2)
Example 11: 92% by weight of Desmomelt®530 (Covestro AG)
  5% by weight of dicumyl peroxide (CAS 80-43-3)
  3% by weight of vinyltriethoxysilane (CAS 78-08-0)
Example 12: 72% by weight of Desmomelt®530 (Covestro AG)
  20% by weight of tris[2-(acryloyloxy)ethyl] isocyanurate (CAS 40220-08-04)
  5% by weight of dicumyl peroxide (CAS 80-43-3)
  3% by weight of 3-methacryloyloxypropyltrimethoxysilane (CAS 2530-85-0)
Example 13: 94% by weight of Desmomelt®530 (Covestro AG)
  5% by weight of dicumyl peroxide (CAS 80-43-3)
  1% by weight of 3-methacryloyloxypropyltriethoxysilane (CAS 21142-29-0)
Example 14: 93% by weight of Desmomelt®530 (Covestro AG)
  5% by weight of dicumyl peroxide (CAS 80-43-3)
  2% by weight of 3-methacryloyloxypropyltriethoxysilane (CAS 21142-29-0)
Example 15: 94% by weight of Desmomelt®530 (Covestro AG)
  5% by weight of dicumyl peroxide (CAS 80-43-3)
  1% by weight of 3-methacryloyloxypropyltrimethoxysilane (CAS 2530-85-0)
Example 16: 93% by weight of Desmomelt®530 (Covestro AG)
  5% by weight of dicumyl peroxide (CAS 80-43-3)
  2% by weight of 3-methacryloyloxypropyltrimethoxysilane (CAS 2530-85-0)

Examples 1 to 3 (above) are comparative examples (without addition of dicumyl peroxide); and Examples 4 to 16 (above) are inventive examples.

The respective components were dissolved homogeneously in methyl ethyl ketone (CAS 78-93-3) corresponding to the respective composition, such that the total content of the aforementioned compositions (Examples 1 to 12; sum total of the components mentioned in each case) in the solvent was 25% by weight. The solution was then coated in each case by known methods onto a release paper known by the person skilled in the art to be suitable for silane-containing compositions and dried in a suitable air circulation drying cabinet at 70° C. for 30 min, so as to result in each case in an adhesive film of 100 μm (dry film thickness).

The corresponding adhesive films are examined by the test methods cited above as fresh specimens (within . . . after the above drying, reported as "initial") or after defined storage in a drying cabinet in a climate-controlled room (see details in the individual experiments in the table), which led to the following results (a: standard deviation from multiple measurements):

TABLE 1

Push-out test/moisture/heat stability test results

| | Push-out | | Moisture/heat stability | |
|---|---|---|---|---|
| Example | MPa | σ | MPa | σ |
| 1 | 4.7 | 0.48 | failed | — |
| 2 | 4.5 | 0.16 | failed | — |
| 3 | 4.0 | 0.55 | failed | — |
| 4 | 4.3 | 0.13 | 3.2 | 0.84 |
| 5 | 4.4 | 0.05 | 3.1 | 0.74 |
| 6 | 4.4 | 0.20 | 3.1 | 0.69 |
| 7 | 5.8 | 0.54 | 7.8 | 0.34 |
| 8 | 6.7 | 0.42 | 7.8 | 0.45 |
| 9 | 6.1 | 0.53 | 4.0 | 0.32 |
| 10 | 4.6 | 0.24 | 4.4 | 0.36 |
| 11 | 6.2 | 0.46 | 4.0 | 0.44 |
| 12 | 6.8 | 0.24 | 3.8 | 0.27 |
| 13 | 4.6 | 0.67 | 6.9 | 0.53 |
| 14 | 5.4 | 0.47 | 7.1 | 0.37 |
| 15 | 5.0 | 0.82 | 6.8 | 0.20 |
| 16 | 6.1 | 0.63 | 6.8 | 0.33 |

Adhesive films corresponding to the respective examples; initial testing (fresh sample without further storage).
Compression conditions (production of the test specimens): 12 s @ 180° C. @ 10 bar
Moisture/heat stability: 72 h @ 85° C. @ 85% RH
Failure: slippage of substrate (1), blistering The test results in Table 1(see above) show that only inventive Examples 4 to 16 with use of dicumyl peroxide meet the demands set in accordance with the invention (push-out value at least 4 MPa, after moist/hot storage still >3 MPa), whereas comparative examples 1 to 3without use of peroxides failed in the moist/hot storage.

The use of silane compounds as adhesion promoters (Examples 7 to 16) can further improve moisture/heat resistance compared to the examples without silane (Examples 4 to 6).

TABLE 2

Latency test results

| | Push-out | | Moisture/heat stability | |
|---|---|---|---|---|
| Storage | MPa | σ | MPa | σ |
| initial | 5.12 | 1.02 | 5.91 | 0.56 |
| 8 w @ RT | 5.87 | 0.21 | 5.76 | 0.18 |
| 18 w @ RT | 5.94 | 0.33 | 6.30 | 0.38 |
| 4 w @ 40° C. | 5.06 | 0.47 | 5.58 | 0.37 |
| 10 w @ 40° C. | 5.56 | 0.24 | 5.87 | 0.87 |
| 18 w @ 40° C. | 5.36 | 0.76 | 5.12 | 0.48 |

Adhesive film according to Example 8.
Storage of the adhesive films prior to production of the test specimens as specified in the table.
Compression conditions (production of the test specimens): 10 s @ 190° C. @ 10 bar
For results in graph form, see FIG. 1.

It is apparent from the results in Table 2 (see above) that both initial force values and those after defined storage in the push-out test in the region of 5 MPa or more can be achieved, and the requirements of the invention are thus met.

TABLE 3

Push-out and Moisture/heat stability test results

| Example | Compression Time | Push-out MPa | σ | Moisture/heat stability MPa | σ |
|---|---|---|---|---|---|
| 7 | 12 s | 6.3 | 0.56 | 5.6 | 0.03 |
|   | 30 s | 6.7 | 0.06 | 6.6 | 0.25 |
|   | 60 s | 6.6 | 0.15 | 6.2 | 0.47 |
| 8 | 12 s | 6.8 | 0.25 | 5.8 | 0.32 |
|   | 30 s | 6.8 | 0.1 | 7.1 | 0.1 |
|   | 60 s | 6.5 | 0.17 | 6.5 | 0.37 |

Storage: 18 w @ 40° C.
Compression conditions (production of the test specimens): 180° C. @ 10 bar for the time specified in each case
Moisture/heat stability: 72 h @ 85° C. @ 85% RH All the samples of the invention examined in Table 3 (see above) have been shown to meet the demands made (push-out value at least 4 MPa, after moist-hot storage still >3 MPa.

TABLE 4

Process window results

| Example | Compression Time | Temperature | Push-out MPa | σ |
|---|---|---|---|---|
| 8 | 30 s | 100° C. | 5.21 | 2.97 |
|   | 60 s | 100° C. | 7.28 | 0.43 |
|   | 120 s | 100° C. | 8.18 | 0.60 |
|   | 30 s | 125° C. | 8.07 | 0.35 |
|   | 60 s | 125° C. | 8.43 | 0.29 |
|   | 120 s | 125° C. | 8.67 | 0.45 |
|   | 30 s | 150° C. | 8.38 | 0.25 |
|   | 60 s | 150° C. | 8.55 | 0.34 |
|   | 120 s | 150° C. | 8.71 | 0.20 |
|   | 12 s | 180° C. | 6.70 | 0.42 |
|   | 30 s | 180° C. | 6.80 | 0.33 |
|   | 60 s | 180° C. | 6.54 | 0.35 |
|   | 120 s | 180° C. | 6.00 | 0.26 |

Adhesive film according to Example 8; initial testing (fresh sample without further storage).
Compression conditions (production of the test specimens): 5 bar, cycle time and temperature as specified.

It was found in the testing shown in Table 4 (see above) that compression conditions at 100° C. for 30 s and at 180° C. for 120 s are outside the process window since the push-out values are below the target value of 6.53 MPa [=0.75*maximum push-out value=0.75*8.71 MPa, maximum push-out value under compression conditions 120 s; 150° C.].

TABLE 5

Shock performance

| Compression conditions | E [J] | σ |
|---|---|---|
| 30 s @ 170° C. @ 10 bar | 57 | 4.45 |
| 10 s @ 190° C. @ 10 bar | 55 | 4.32 |

Adhesive film according to Example 8, film thickness 100 μm.
Initial testing (fresh sample without further storage) at room temperature (23° C.).
Compression conditions as specified in Table 5 (see above).

The samples examined in Table 5 (see above) have been found to be very shock-resistant.

DSC Analyses
Examples 5, 7, 8 and 13 to 16 were used to conduct DSC analyses in order to examine the effect of the amount of silane on the crosslinking characteristics (i.e. the curing of the adhesive film). The results are shown in FIGS. 2 and 3.

DSC Analysis:
Instrument: DSC 204 F1 Phoenix, from Netzsch
Crucible: Al crucible, lid manually perforated
Temperature program: 20° C.→−140° C.; 140° C.→200° C. (first heating curve)
Temperature rate: 10 K/min (cooled with liquid N$_2$)
Method/SOP: DSC-01

Figure 2:
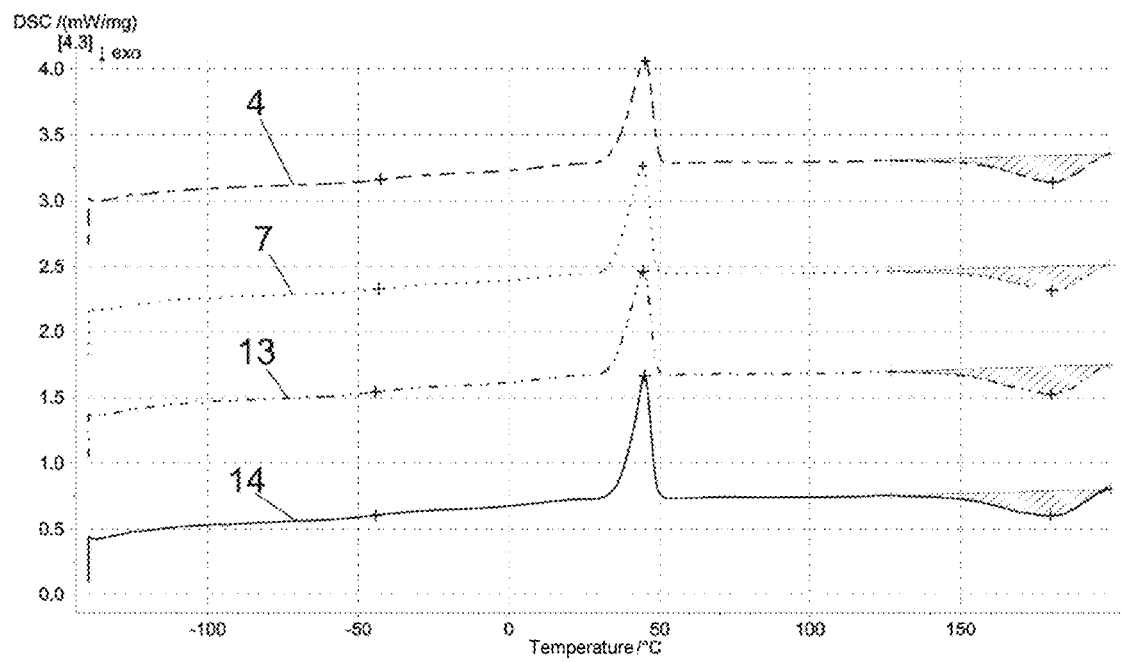
FIG. 2 is a dynamic differential calorimetry (DSC) plot of example adhesive films, according to embodiments of the disclosure.
Figure 3:
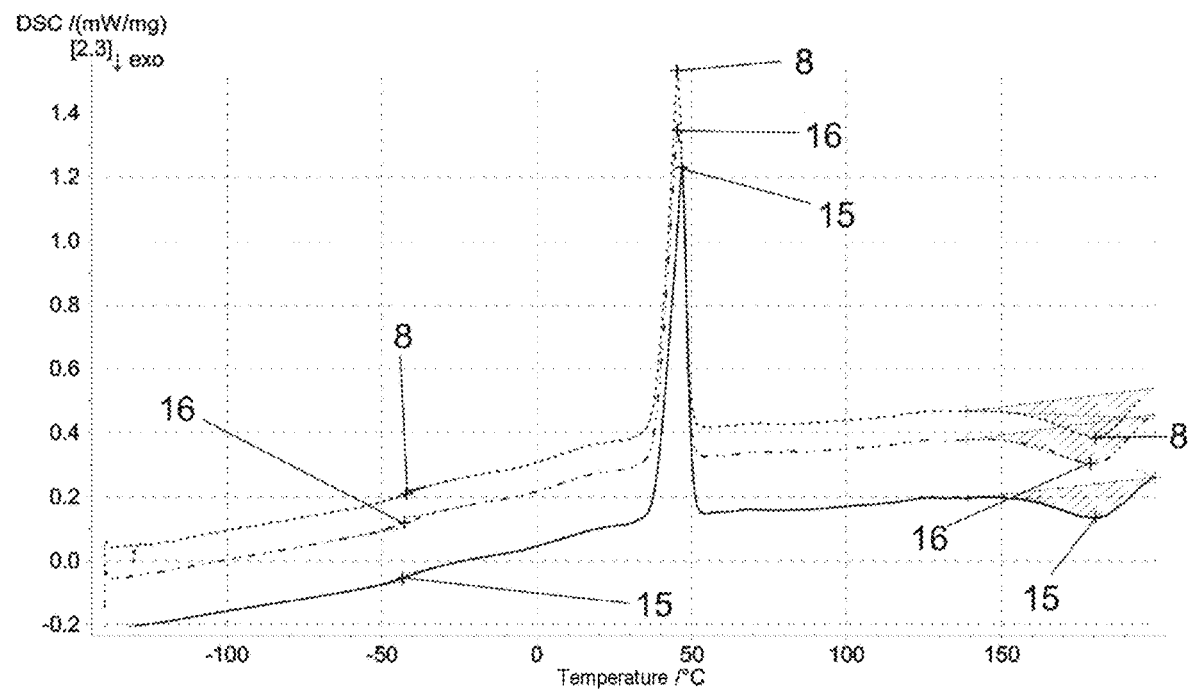
FIG. 3 is a DSC plot of example adhesive films, according to embodiments of the disclosure.

FIG. 2 shows Examples 7, 13 and 14 with use of 3-methacryloyloxypropyltriethoxysilane (CAS 21142-29-0), and FIG. 3 shows Examples 8, 15 and 16 with use of 3-methacryloyloxypropyltrimethoxysilane (CAS 2530-85-0). For comparison, FIG. 2 also shows Example 4 without the use of silane.

In a second heating curve conducted for each of the two measurements (200° C.→−140° C.; −140° C.→250° C., not shown), it is not possible to observe any post-crosslinking.

The curves are labeled in FIGS. 2 and 3 in accordance with the Example numbers. The symbols "+" symbolize the positions of the values as specified in the two tables below, Tables 6 and 7.

TABLE 6

DSC values in FIG. 2:

| Example | Glass transition $T_G$ [° C.] | Position of peak 1 [° C.] | Position of peak 2 [° C.] |
|---|---|---|---|
| 7 | −42.8 | 44.1 | 180.7 |
| 14 | −43.3 | 44.4 | 180.3 |
| 13 | −44.4 | 44.6 | 179.9 |
| 5 | −44.4 | 44.9 | 180.0 |

TABLE 7

DSC values in FIG. 3:

| Example | Glass transition $T_G$ [° C.] | Position of peak 1 [° C.] | Position of peak 2 [° C.] |
|---|---|---|---|
| 15 | −42.2 | 45.3 | 180.5 |
| 16 | −42.8 | 45.4 | 178.9 |
| 8 | −43.4 | 46.8 | 180.4 |

These DSC traces (as shown in FIGS. 2 and 3) show that the maximum exothermicity is fairly constant at 180° C. and the enthalpy of reaction is virtually independent of the silane content. The addition of silane thus has a positive effect on moisture/heat resistance as shown further up in the tests, but no significant effect on the crosslinking reaction (curing) of the adhesive film.

The invention claimed is:

1. A latently reactive adhesive composition consisting of: one or more polymers and at least one peroxide, wherein, the one or more polymers comprises at least 50% by weight of a polyurethane lacking C=C multiple bonds, wherein the at least one peroxide has the general structural formula R—O—O—R' where R and R' each represent organyl groups or collectively represent a cyclic organyl group, and wherein the polyurethane of the adhesive composition melts and crosslinks upon thermal activation.

2. The latently reactive adhesive composition of claim 1, wherein the at least one peroxide is dicumyl peroxide.

3. A latently reactive adhesive composition consisting of: one or more polymers, at least one peroxide, and at least one adhesion promoter, wherein, the one or more polymers comprises at least 50% by weight of a polyurethane lacking C=C multiple bonds, wherein the at least one peroxide has the general structural formula R—O—O—R' where R and R' each represent organyl groups or collectively represent a cyclic organyl group, and wherein the polyurethane of the adhesive composition melts and crosslinks upon thermal activation.

4. The latently reactive adhesive composition according to claim 1, wherein an amount of the at least one peroxide in the adhesive is within a range of from 0.1% to 10% by weight.

5. The latently reactive adhesive composition according to claim 1, wherein the at least one peroxide is a ketone peroxide or a cyclic peroxide.

6. The latently reactive adhesive composition according to claim 1, wherein the polyurethane is semicrystalline.

7. The latently reactive adhesive composition according to claim 1, wherein the polyurethane has a maximum softening temperature of not more than 25° C.

8. The latently reactive adhesive composition according to claim 1, wherein the polyurethane has a maximum glass transition temperature of not more than −25° C., as determined by dynamic differential calorimetry (DSC).

9. The latently reactive adhesive composition according to claim 1, wherein an adhesive strength of the latently reactive adhesive composition, as disposed on a substrate surface, after curing, and after storage at 23° C., 50% relative humidity (RH) for eighteen weeks, is at least 90% of an adhesive strength of the latently reactive adhesive composition, as disposed on a substrate surface, after curing, and after storage for not more than one day at 23° C., 50% RH.

10. The latently reactive adhesive composition according to claim 1, wherein an adhesive strength of the latently reactive adhesive composition, as disposed on a substrate surface, after curing, and after storage at 40° C. for eighteen weeks in a drying cabinet under standard climatic conditions (23° C./50% relative humidity (RH)), is at least 90% of an adhesive strength of the latently reactive adhesive composition, as disposed on a substrate surface, after curing, and after storage for not more than one day at 23° C., 50% RH.

11. The latently reactive adhesive composition according to claim 3, wherein the at least one peroxide is dicumyl peroxide.

12. The latently reactive adhesive composition according to claim 3, wherein an amount of the at least one peroxide in the adhesive is within a range of from 0.1% to 10% by weight.

13. The latently reactive adhesive composition according to claim 3, wherein the at least one peroxide is a ketone peroxide or a cyclic peroxide.

14. The latently reactive adhesive composition according to claim 3, wherein the at least one adhesion promoter is at least one silane functionalized by one or more alkoxy groups.

15. The latently reactive adhesive composition according to claim 14, wherein the one or more alkoxy groups comprises methoxy and/or ethoxy groups.

16. The latently reactive adhesive composition according to claim 3, wherein the polyurethane is semicrystalline.

17. The latently reactive adhesive composition according to claim 3, wherein the polyurethane has a maximum softening temperature of not more than 25° C.

18. The latently reactive adhesive composition according to claim 3, wherein the polyurethane has a maximum glass transition temperature of not more than −25° C., as determined by dynamic differential calorimetry (DSC).

19. The latently reactive adhesive composition according to claim 3, wherein an adhesive strength of the latently reactive adhesive composition, as disposed on a substrate surface, after curing, and after storage at 23° C., 50% relative humidity (RH) for eighteen weeks, is at least 90% of an adhesive strength of the latently reactive adhesive composition, as disposed on a substrate surface, after curing, and after storage for not more than one day at 23° C., 50% RH.

20. The latently reactive adhesive composition according to claim 3, wherein an adhesive strength of the latently reactive adhesive composition, as disposed on a substrate surface, after curing, and after storage at 40° C. for eighteen weeks in a drying cabinet under standard climatic conditions (23° C./50% relative humidity (RH)), is at least 90% of an adhesive strength of the latently reactive adhesive composition, as disposed on a substrate surface, after curing, and after storage for not more than one day at 23° C., 50% RH.

* * * * *

UNITED STATES PATENT AND TRADEMARK OFFICE
CERTIFICATE OF CORRECTION

PATENT NO. : 11,535,778 B2
APPLICATION NO. : 17/051074
DATED : December 27, 2022
INVENTOR(S) : Kupsky et al.

It is certified that error appears in the above-identified patent and that said Letters Patent is hereby corrected as shown below:

In the Specification

Column 5, Line 47:
"$t_{1/2}$ ln2/k for $c_t(t_{1/2}) = c_0/2$" should be --$t_{1/2} = ln2/k$ for $c_t(t_{1/2}) = c_0/2$--.
Column 6, Line 35:
"t/2" should be --$t_{1/2}$--.
Column 6, Line 36:
"t/2" should be --$t_{1/2}$--.
Column 6, Line 37:
"t/2" should be --$t_{1/2}$--.
Column 8, Line 26:
"TG" should be --$T_G$--.
Column 20, Line 6:
"(a: standard" should be --(α: standard--.

In the Claims

Column 23, Claim 10, Line 44:
"RII" should be --RH--

Signed and Sealed this
Thirteenth Day of February, 2024

Katherine Kelly Vidal
*Director of the United States Patent and Trademark Office*